United States Patent [19]
Parent

[11] Patent Number: 5,274,432
[45] Date of Patent: Dec. 28, 1993

[54] TOW VEHICLE ALIGNMENT METHOD AND APPARATUS

[76] Inventor: Richard A. Parent, 3127 - 92nd Street, Edmonton, Alberta, Canada, T6N 1B9

[21] Appl. No.: 947,372

[22] Filed: Sep. 18, 1992

Related U.S. Application Data

[63] Continuation of Ser. No. 643,598, Jan. 18, 1991, abandoned.

[51] Int. Cl.⁵ .............................................. G01B 11/27
[52] U.S. Cl. ..................... 356/138; 356/143; 33/264
[58] Field of Search ............... 356/138, 139, 142, 143, 356/150; 33/264; 280/477, 186

[56] References Cited

U.S. PATENT DOCUMENTS

| | | |
|---|---|---|
| 2,984,011 | 5/1961 | Hamilton . |
| 4,012,056 | 3/1977 | Christensen ..................... 280/477 |
| 4,257,706 | 3/1981 | Smith . |
| 4,627,634 | 12/1986 | Coleman ........................ 33/264 |
| 4,723,788 | 2/1988 | Sutel ................................ 33/264 |

*Primary Examiner*—Samuel A. Turner
*Attorney, Agent, or Firm*—Barrigar & Oyen

[57] ABSTRACT

A method and apparatus for monitoring towed vehicles, such as trailers and the like, which are not visible in a rear view mirror of a tow vehicle. The method consists of, firstly, attaching markers to a towed vehicle such that the markers are visible on each side of a towing vehicle to which the towed vehicle is coupled. Secondly, projections are attached to each side of the towing vehicle. The projections are positioned on each side of the towing vehicle so that the projections are in respective linear alignment with the markers when viewed from respective side mounted rear view mirrors of the towing vehicle. When the markers cease to be in linear alignment with the projections during driving, the driver of the towing vehicle is alerted that there has been an alteration in the positioning of the towed vehicle relative to the towing vehicle, thereby indicating a problem requiring a stoppage of the vehicles.

15 Claims, 4 Drawing Sheets

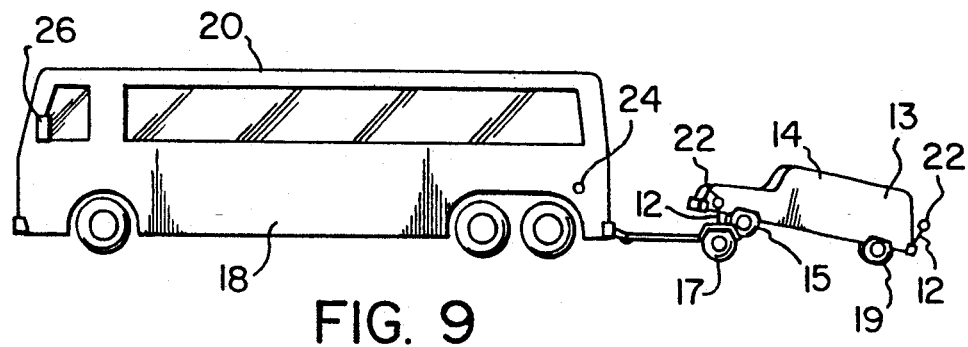
FIG. 9
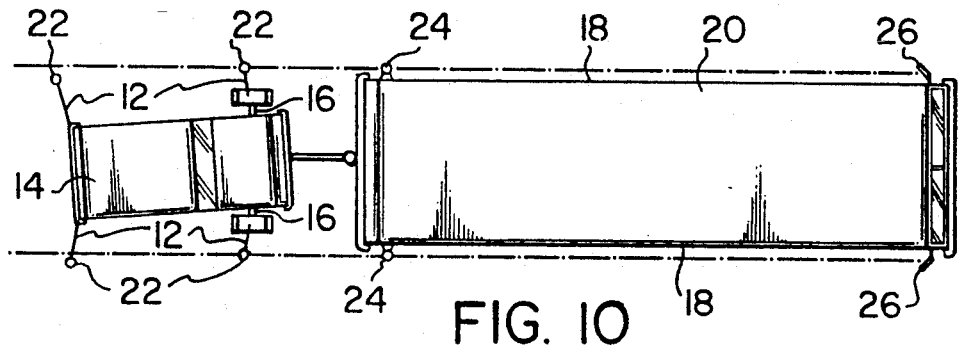
FIG. 10
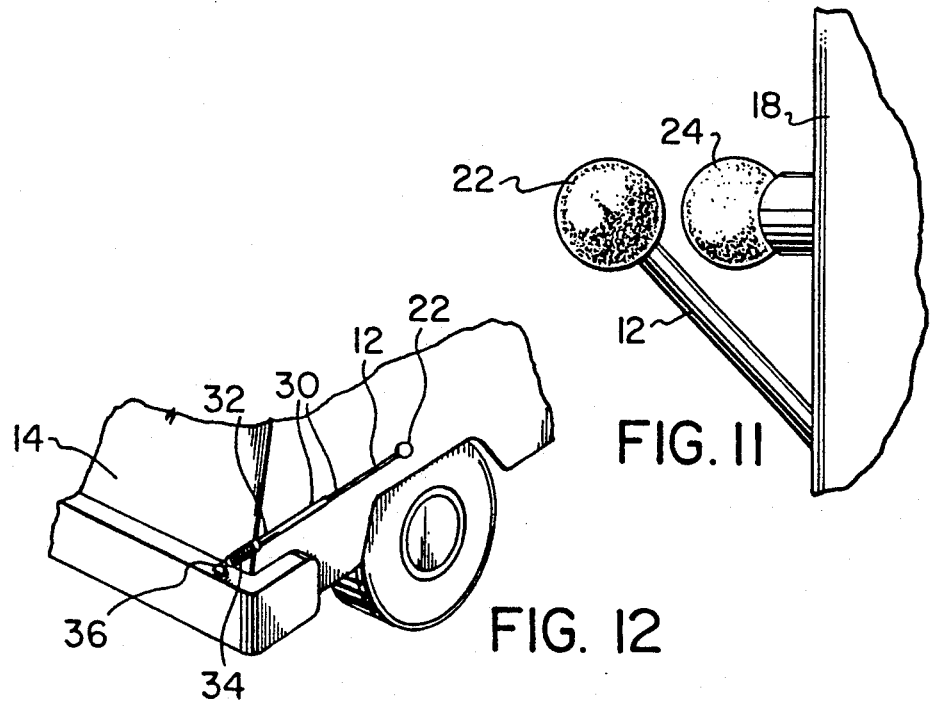
FIG. 11
FIG. 12

TOW VEHICLE ALIGNMENT METHOD AND APPARATUS

This is a continuation of U.S. application Ser. No. 07/643,598, filed Jan. 18, 1991, now abandoned.

FIELD OF THE INVENTION

The present invention relates to a novel method and apparatus for monitoring towed vehicles. More particularly, the method pertains to one or more markers which are mounted on the towed vehicle and one or more monitors which are mounted in alignment on the towing vehicle to thereby enable the relative displacement of each vehicle to be monitored through one or more rear view mirrors.

BACKGROUND OF THE INVENTION

There are many types of towed vehicles, such as trailers and the like, which are not visible in one or more rear view mirrors mounted on the towing vehicle. The problem is particularly acute with wide recreation vehicles or motor homes. Since a narrow vehicle being towed behind a motor home is not visible to the driver of the motor home in the sight lines of any of his side mounted rear view mirrors, or the centre mounted rear view mirror, if applicable, the driver has no idea whether the vehicle is behaving properly.

There are many things which can go wrong with a towed vehicle. The hitch can fail or come loose. One of the tires can become flat. A wheel bearing can seize. An axle can bend or fail. Some part of the suspension can fail. The towed vehicle can be struck from the rear. Since the motor home or towing vehicle is heavy and has a lot of momentum, it is very difficult for the driver of the towing vehicle to sense through the feel in the steering wheel that something is wrong with the towed vehicle, particularly if it cannot be seen.

In the absence of a timely warning to the driver of the towing vehicle, hitch failure may result in the loss of the towed vehicle or the development of various hazardous conditions. Without the generation of an early warning to the driver when tire, bearing, axle, or suspension problems begin to develop, the driver of the towing vehicle will carry on until a serious problem has occurred such as having the trailer dragged behind the towing vehicle thereby resulting in damage or destruction of the towed vehicle. The heat generated by dragging a trailer over a prolonged distance, with a low or flat tire or with metal in contact with pavement, presents a danger of fire to inflammable components which may then consume the towed vehicle when the towing vehicle is eventually stopped. Minor rear end impact is difficult to detect, yet it can be sufficient to damage a towed vehicle without alerting the driver of the tow vehicle.

When the towed vehicle is or is not visible to the driver of the towing vehicle, it is still a problem with long towed vehicles such as trailers to determine in the rear view mirror the precise position of the rear end of the trailer. When the markers are mounted at the extreme side rear of the towed vehicle, the markers identify the rear point, giving the driver increased judgement for safer lane changes, maneuvering through tight spots, parking and backing up. For example, with a boat behind a motor home, it is difficult for the driver to back the boat or boat trailer to the water without jack-knifing. The markers mounted on each side of the boat trailer duplicate the movement or location of the boat and assist in backing up.

The foregoing problems have recently been addressed by "high tech" solutions, such as mounting a video camera on the back of the towing vehicle with the camera focused upon the towed vehicle. The video camera solution is expensive and does not provide a complete solution because it does not give an early warning of developing problems. The camera is unavoidably mounted on the top of the towing vehicle and is focused on the top of the towed vehicle. If the video camera is mounted on either side, it is vulnerable to damage by vandalism or colliding with a stationary object. A problem manifesting itself in a change in the positioning of the towed vehicle must be well advanced in order for the problem to be visible in the video camera from that vantage point.

U.S Pat. No. 4,257,706, Smith, issued Mar. 24, 1981, discloses motor vehicle back-up limit gauging methods and apparatus which include a pair of line-of-sight indicators affixed to the left side of the vehicle. They are placed in such positions that the driver of the vehicle when seated in the driving position may establish a line-of-sight by aligning these indicators through the existing rear view mirror. He or she may then back the vehicle to a safe distance from a building wall or other marker by halting the backward progress of the vehicle when the aligned indicators coincide with the ground line of the wall, or with the marker. There is no teaching of a marker and monitor system which relates the position or condition of the towing vehicle with the towed vehicle.

The invention disclosed in U.S. Pat. No. 2,984,011, Hamilton, issued May 16, 1961, relates to a towed vehicle hitching guide which may be used in conjunction with a rear view mirror on the driver's side of the vehicle to enable the driver to properly steer the towing vehicle while backing it up to line up the hitching connection on the towing vehicle with the corresponding connection on the towed vehicle. This system does not enable the driver to monitor the position or condition of the trailer.

SUMMARY OF THE INVENTION

The present invention provides a method for monitoring the position or location of towed vehicles, such as trailers and the like, which are visible or not visible in one or more side mounted rear view mirrors of a towing vehicle. The method comprises, firstly, attaching one or more markers to a towed vehicle such that the marker(s) are visible to the driver on at least one side of the towing vehicle to which the towed vehicle is coupled. The marker(s) can have enlarged ends to thereby improve the visibility of the marker(s) in the rear view mirrors of the towing vehicle. Secondly, one or more reference markers are attached to one or both sides of the towing vehicle in a position such that the reference markers are in linear alignment with the marker(s) when viewed from one or more side mounted rear view mirrors of the towing vehicle. When the marker(s) cease to be in linear alignment with the reference marker(s) during driving, the driver of the towing vehicle knows there has been an alteration in the relative position of the towed vehicle and the towing vehicle thereby indicating a potential problem which requires stoppage of the vehicles.

The invention provides a method of monitoring the relative orientation of a towed vehicle coupled to a towing vehicle equipped with one or more side mounted rear view mirrors which comprises: (a) attaching a reference marker to the side of the towed vehicle, the marker being visible in the rear view mirror of the towing vehicle; (b) attaching a monitor to the side of the towing vehicle in a position that the monitor intersects the line of sight between the marker and the rear view mirror.

In another aspect, the invention includes an apparatus which can be used in accordance with the teachings of the described method. The marker mounted on the towed vehicle can be a tubular telescopic body having a first end which attaches to the towed vehicle. The first end can be secured to the towed vehicle by a spring to enable the telescopic body to pivot relative to the towed vehicle. The second end remote from the towed vehicle can be enlarged to enhance visibility. The second end can be coated with a fluorescent or reflective material or can be illuminated.

BRIEF DESCRIPTION OF THE DRAWINGS

These and other features of the invention will become more apparent from the following description in which reference is made to the appended drawings, wherein:

FIG. 9 represents a side elevation of the same vehicles illustrated in FIG. 1, except that the front wheels of the vehicle being towed have moved partially off the trailer.

FIG. 10 represents a top view of the two vehicles illustrated in FIG. 9.

FIG. 11 represents a driver's view through a rear view mirror mounted on the side of the towing vehicle illustrated in FIGS. 7 or 9.

FIG. 12 represents a perspective view of a specific embodiment of a marker mounted on a trailer.

DETAILED DESCRIPTION OF SPECIFIC EMBODIMENTS OF THE INVENTION

Specific embodiments of the method and apparatus of the invention will now be described in detail with reference to FIGS. 1 through 14. The basic concept of the described method is that a potential problem with a vehicle which is being towed, or the towing vehicle itself, will manifest itself by an alteration in the alignment of one or more markers mounted on the towed vehicle and one or more reference markers mounted on the towing vehicle. If the towing vehicle develops a problem such as a leaking tire, its position relative to the towed vehicle will become altered. If a problem develops with the towed vehicle, for example, a disconnected hitch, its position relative to the towing vehicle will also become altered. The method of the invention therefore enables the relative positioning of both the towing vehicle and the towed vehicle to be monitored. The method is particularly adapted to monitor towed vehicles, such as trailers and the like, which are not visible in a side mounted rear view mirror of a tow vehicle.

Figure 1:
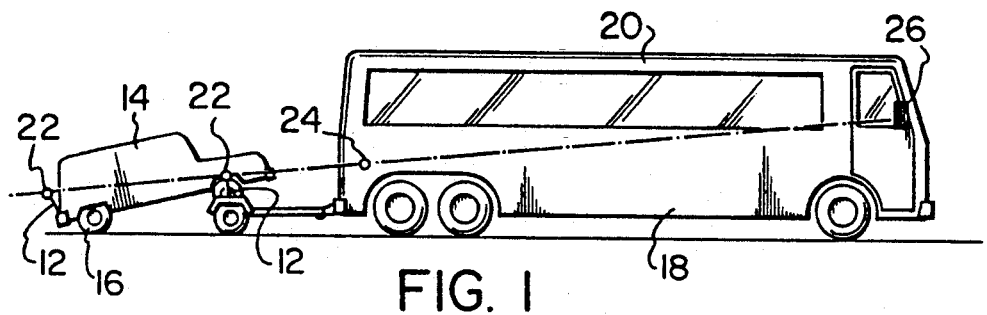
FIG. 1 represents a side elevation of a motor home towing an automobile with the front wheels mounted on a towed trailer.
Figure 2:
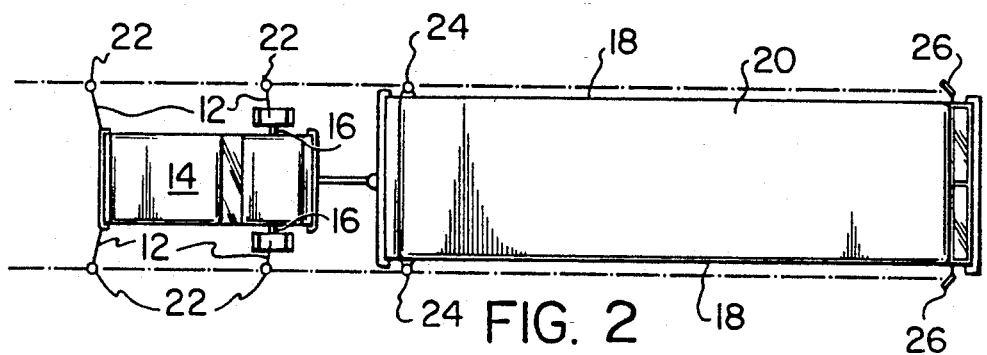
FIG. 2 represents a top view of the two vehicles illustrated in FIG. 1.
Figure 3:
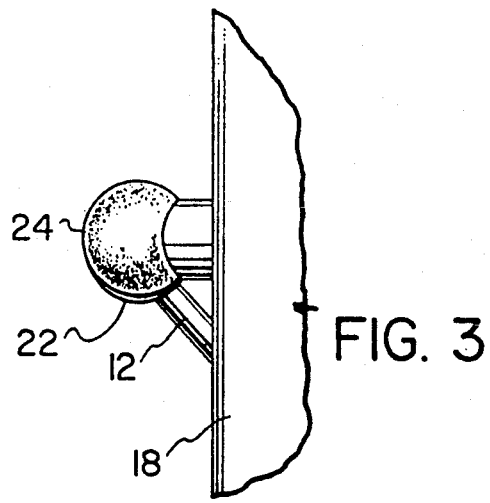
FIG. 3 represents a driver's view through a rear view mirror side mounted on the motor home.

The method of the invention in a specific version comprises the following steps, as illustrated with reference to FIGS. 1 and 2. Firstly, a pair of marker rods 12 is attached to each side of a towed vehicle 14. The rods 12 are preferably attached adjacent each axle 16 of the towed vehicle. In FIGS. 1 and 2, two rods 12 are used, whereas with the single axis trailer illustrated in FIG. 6, only one rod is used. However, only one pair of rods 12 can be used in the embodiment shown in FIGS. 1 and 2 if desired. The pair of rods 12 are arranged to extend laterally from each side of the towed trailer 14 until they are visible beyond each side 18 of the towing vehicle 20 to which towed vehicle 14 is coupled. The unattached end 22 of each of the rods 12 are enlarged so as to be clearly visible in the side mounted rear view mirrors 26 of the motor home 20. Secondly, a pair of reference markers 24 are attached to each side 18 of the towing vehicle 20 in a position such that each reference marker 24, when seen in the side mounted rear view mirror 26 from the driver's seat, is in linear alignment with the respective enlarged unattached ends 22 of the respective rods 12. The desired linear alignment as viewed by the driver in the rear view mirror 26 is illustrated in FIG. 3. As can be seen, the reference marker 24 virtually covers the enlarged end 22. If the enlarged attached end 22 of either rod 12 ceases to be in linear alignment with the reference marker 24 during highway driving, the misalignment serves as a signal to the driver of the tow vehicle 20 that there has been an alteration in the respective positioning of the towed vehicle 14 and the towing vehicle 20 thereby indicating a potential problem which probably requires stoppage of the vehicles 20 and 14.

Figure 4:
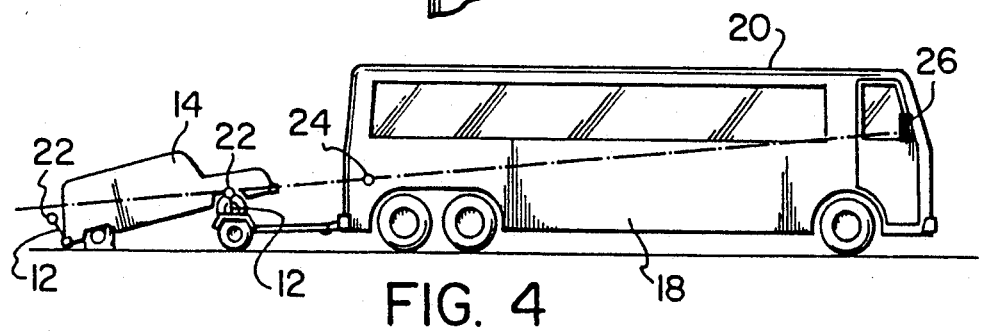
FIG. 4 represents a side elevation of the vehicles illustrated in FIG. 1, except that the vehicle being towed has a flat tire.
Figure 5:
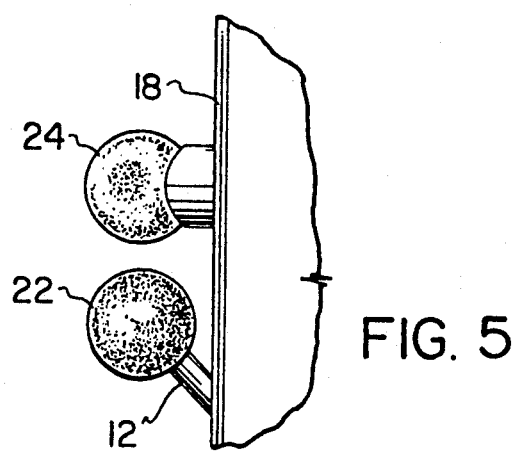
FIG. 5 represents a driver's view through a rear view mirror side mounted on the towing vehicle when the trailer has a flat tire as illustrated in FIG. 4.

A typical linear misalignment of the marker 12 and reference marker 24 is illustrated in FIG. 4 with respect to a flat tire on the towed vehicle 14. When a flat tire occurs, the towed vehicle 14 becomes lower on that side and the driver of the tow vehicle 20 sees in side mounted rear view mirror 26 the marker-reference marker misalignment as illustrated in FIG. 5. The marker 22 has dropped out of alignment with reference marker 24 and the driver then knows that a problem has occurred.

Figure 6:
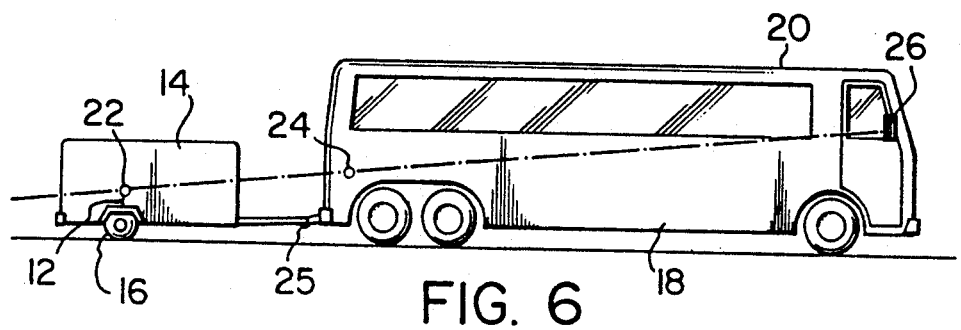
FIG. 6 represents a side elevation of a single axle vehicle being towed by a motor home.
Figure 7:
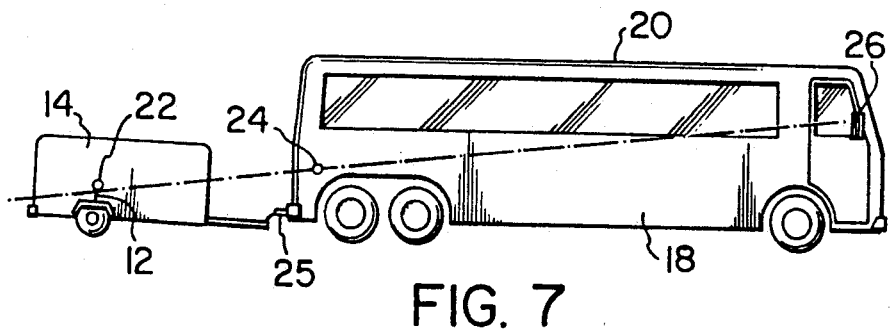
FIG. 7 represents a side elevation of the vehicles illustrated in FIG. 6, except that the hitch of the vehicle being towed has disconnected.
Figure 8:
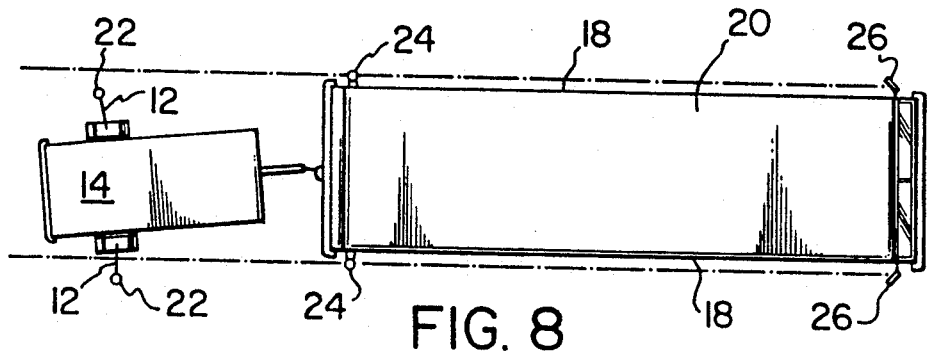
FIG. 8 represents a top view of the two vehicles illustrated in FIG. 7.
Figure 13:
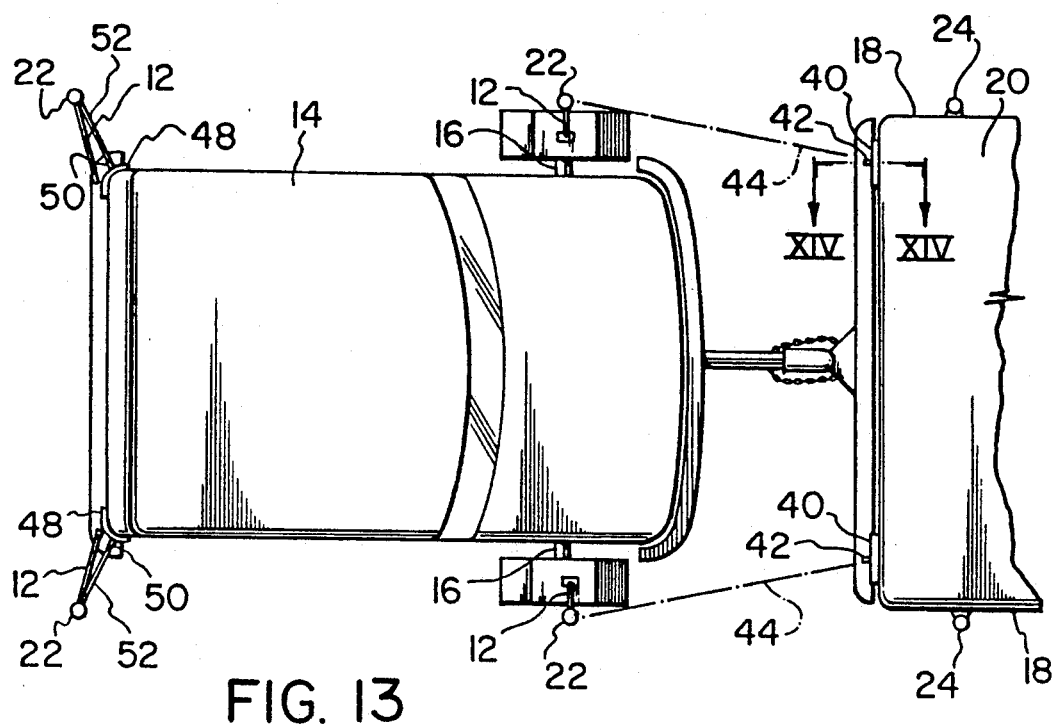
FIG. 13 represents a top view of a specific method of illuminating the marker apparatus illustrated in FIG. 12 by the tail lights of the towing vehicle for night operation.

A further example of linear misalignment is illustrated in FIGS. 7 and 8, where a single axle trailer 14 as illustrated in FIG. 6 has developed a disconnection at the hitch. In FIG. 6, the reference marker 24 and the marker 22 are in visual alignment when seen from rear view mirror 26. However, when the hitch 25 becomes disconnected as illustrated in FIGS. 7 and 8, misalignment occurs. This results in towed vehicle 14 not travelling snugly and securely behind tow vehicle 20. The towed vehicle 14 in such a case usually begins to whip or swing back and forth from side to side. In the absence of the apparatus and method of the invention, the lateral movement of towed vehicle 14 would not be visible to the driver of the tow vehicle 20 until the trailer "jack-knifed" which is a dangerous condition because the towing vehicle 20 may be thrown out of control. With the apparatus and method of the invention, the driver of towing vehicle 20 would see in rear view mirror 26 that the marker 22 was moving from side to side and was out of alignment with reference marker 24. Such a situation is illustrated in FIG. 11.

A further example of misalignment is illustrated in FIGS. 9 and 10. Towed vehicle 14, as illustrated in FIGS. 9 and 10, consists of the combination of a car 13 with its front wheels 15 mounted on a single axle trailer 7. In FIGS. 9 and 10, towed vehicle 14 is illustrated in a condition where one of the tie downs for the front car wheels 15 has come loose thereby permitting one of the wheels 15 of the car to come off the trailer 17. This is a situation which is quite common in the trailer industry. In the absence of the applicant's apparatus and method, the car 13 would be dragged down the highway at an angle thereby wearing away the rubber on the tires of rear wheels 19 of the car 13 and eventually even the metal rims of the rear wheels 19. With the method and apparatus of the invention, the driver of the tow vehicle 20 would see in the side mounted rear view mirror 26 the view that is illustrated in FIG. 11, and can be alerted to a problem.

It is to be understood that the method and apparatus of the invention perform properly in alignment when the towing vehicle and the towed vehicle are travelling down a horizontal straight road. The markers and the reference markers move out of alignment when curved or hilly grades are encountered. The driver is aware of this and checks the markers and reference markers when travelling on level straight roads. However, with experience, the driver can learn to use the markers and reference markers even on curves or hills.

FIG. 12 illustrates an isometric view of a specific rod-like apparatus 12 for monitoring towed vehicles. Rod 12 consists of a plurality of tubular sections 30 which are telescopically connected. The sections 30 may be telescopically extended to lengthen the rod 12 or telescopically nested to shorten the rod 12, in order to accommodate various widths of towing vehicles 20. Rod 12 has a first end 32 which is secured to the towed vehicle 14 and a bulbous enlarged second end 22, which is readily visible to the driver in the rear view mirror 26. It is advantageous that the bulbous enlarged second end 22 is made of materials which reflect light or are capable of illumination in some way so as to improve visibility. It is also advantageous that the bulbous enlarged second end 22 be adapted to withstand considerable abuse because it will undoubtedly collide at some point with a stationary object. For this reason, the construction materials used must be durable, impervious to the elements, and impact resistant in the event that the bulb 22 is struck against another object. The applicant has found that a fluorescent coloured cylinder with an impact resistant bumper on the end is suitable for the purpose.

When the rod 12 is installed, first end 32 of rod 12 is secured by a spring 34 to the towed vehicle 14. The spring 34 is advantageous because it enables pivoting. Otherwise, the rod 12 will tend to break as a result of excessive vibration on rough roads, or as a result of striking a stationary object. An example where an object may be struck by bulbous unattached end 22 of rod 12 is in turning a tight corner where a power pole is positioned immediately adjacent the corner. Rod 12 must be secured to towed vehicle 14 in such a manner as to permit adjustment on a vertical plane in order to allow bulbous unattached end of marker rod 12 to be placed in linear alignment with monitor projection 24. The specific embodiment illustrated uses a bracket 36 which permits pivotal movement of the rod 12, not only for linear adjustment but also for movement into a stored position when the rods 12 are not required for monitoring purposes.

In a specific embodiment, the marker 22 may be coloured yellow and the reference marker 24 may be coloured red. In this way, the driver can readily identify each component, by using any contrasting colour. If a middle marker is used, it can be coloured amber, for example. In another embodiment, the marker rod may be mounted horizontally and the reference marker may be mounted vertically. In this way, they act as one half of a set of cross hairs. Thus the driver can readily detect when there has been a change in the angle between the marker rod and the reference marker.

The use of the apparatus illustrated has been described in relation to the method of the invention. Rods 12 are pivoted from a stored position to an operative position. The operative position is when the enlarged bulbous ends 22 of rods 12 are extended telescopically until they are visible beyond each side 18 of a tow vehicle 20. The spring 34 provides the resiliency required so that when objects are struck during use, the rods 12 do not become bent or break off.

Figure 14:
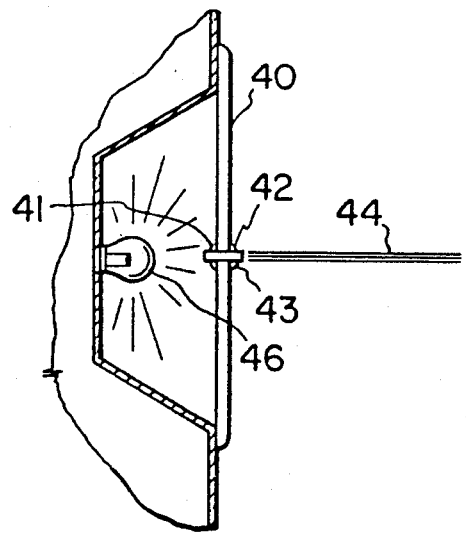
FIG. 14 represents a detailed view of a tail light adapted to illuminate the marker illustrated in FIG. 13.

In order to use the specifically described method and apparatus at night, the enlarged ends 22 of the rods 12 must be visible to the driver of the tow vehicle 20 in his side mounted rear view mirror 26. Light bulbs can be installed in the enlarged ends 22. However, this is relatively expensive. Further, the light bulb, and even the wiring to the light bulb can break due to any impact that the rods 12 receive when they strike stationary objects. An alternative, less expensive and more trouble-free method of illumination has been invented as illustrated in FIG. 14. The method involves drilling a hole 41 through each of the rear tail lights 40 of the two vehicles 20 and 14. An optic fibre 42 or a group of fibres is then inserted into each of the holes 41. The optic fibre 42 would normally be sealed in position by a clear sealant 43 to keep water and dirt out of the rear tail light. The optic fibre 42 in each rear light is aligned with the respective enlarged ends 22 of the applicable rods 12 on the respective sides of the vehicle. Light from each light bulb 46 within each rear tail light 40 then shines through respective optic fibre 42 and produces a beam of light 44 which is focused upon the enlarged end 22 of the rod 12 that is located rearwardly of that light. This makes the end 22 visible to the driver for night driving. In appropriate cases where two sets of rods 12 are used on each side, a similar procedure would be followed by inserting an optic fibre 50 into tail lights 48 of towed vehicle 14 to project beams of light 52 upon the bulbous enlarged ends 22 of the rearwardly positioned rods 12. The fluorescent material on the ends 22 readily reflects the beamed light and is easily seen in the rear view mirror 26. In certain cases, it may be advantageous to illuminate the monitors. However, generally, the monitor does not have to be illuminated because it is used only to obscure the marker. If the illuminated marker becomes visible to the driver, then it has moved out from behind the monitor and the driver knows then that there has been a change in position.

The method as described provides a simple and inexpensive method of monitoring towed vehicles, such as trailers and the like, which are, or are not, visible in a side mounted rear view mirror of a tow vehicle. The apparatus, as described, provides an effective device for use in accordance with the teachings of the method. It will finally be apparent to one skilled in the art that modifications may be made to the specific embodiments of the apparatus. In particular, enlarged unattached end 22 of rods 12 need not be bulbous, as a different geometric figure can be used. Also, various ways of illuminating the markers can be used.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. A method of monitoring the dynamic relative alignment position of a forwardly moving towed vehicle coupled by a hitch to a forwardly moving towing vehicle equipped with a first side mounted rear view mirror mounted on a first forward side of the towing vehicle and a second opposite side mounted rear view mirror mounted on a second forward opposite side of the towing vehicle which comprises:

(a) affixing a first trailer marker to a respective first side of the towed vehicle rearward of the hitch, the trailer marker being visible in the first side rear view mirror mounted on the first side of the towing vehicle;

(b) affixing a first reference marker to the respective first side of the towing vehicle in a position that is forward of the hitch and rearward of the first mirror the first reference marker intersecting a first line of sight between the first trailer marker on the first side of the towed vehicle and the rear view mirror on the first side of the towing vehicle;

(c) affixing a second trailer marker to a respective second side of the towed vehicle rearward of the hitch, the second trailer marker being visible in the second side rear view mirror mounted on the second side of the towing vehicle; and (d) affixing a second reference marker to the respective second side of the towing vehicle in a position that is forward of the hitch but rearward of the second mirror, the second reference marker intersecting a second line of sight between the second trailer marker on the second side of the towed vehicle and the rear view mirror on the second side of the towing vehicle, the first and second trailer markers and the first and second reference markers being maintained in place, and in sum, a constant distance from each other, while the towing vehicle and the towed vehicle are under dynamic transport conditions, and any upward or downward displacement of alignment between the towed vehicle and the towing vehicle being indicated by the first or second trailer markers or the first or second reference markers ranking upwardly or downwardly from the first or second lines of sight.

2. A method as claimed in claim 1 wherein two markers are mounted on each side of the towed vehicle.

3. A method for monitoring a forwardly moving towed vehicle from a forwardly moving towing vehicle, which towed vehicle is attached by a hitch to the towing vehicle and is not visible in either of a pair of rear view mirrors mounted respectively on the first and second opposite sides of the towing vehicle, comprising:

(a) affixing a first elongated trailer marker to a first side of the towed vehicle rearward of the hitch so that the first trailer marker extends beyond the first side of the towing vehicle and is visible to a towing vehicle operator in a first rear view mirror;

(b) affixing a first reference marker to a first side of the towing vehicle forward of the hitch and rearward of the first mirror so that the first reference marker is located between the mirror and the first trailer marker on the first side and is in linear alignment with the first trailer marker removed from the towed vehicle when viewed by the vehicle operator from the rear view mirror on the first side of the towing vehicle;

(c) affixing a second elongated trailer marker to a second side of the towed vehicle rearward of the hitch so that the second trailer marker extends beyond the second side of the towing vehicle and is visible to the towing vehicle operator in the second rear view mirror; and (d) affixing a second reference marker to the second opposite side of the towing vehicle forward of the hitch and rearward of the second mirror so that the second reference marker is located between the mirror and the second trailer marker on the second opposite side and is in linear alignment with the second trailer marker removed from the towed vehicle when viewed by the vehicle operator from the rear view mirror of the second side of the towing vehicle, the first and second trailer markers and the first and second reference markers being maintained in place and in sum, a constant distance from each other while the towing vehicle and the towed vehicle are under forwardly moving transport conditions, and any vertical displacement of alignment between the towed vehicle and the towing vehicle being indicated by the first or second trailer marker or the first or second reference marker moving out of vertical alignment with one another.

4. A method as defined in claim 3 wherein a third marker is attached to the first side of the towed vehicle rearward of the hitch and a fourth marker is attached to the second opposite side of the towed vehicle, rearward of the hitch, the additional third and fourth markers being placed in linear alignment with the respective first and second elongated markers on the first and second sides of the towed vehicle, and the first and second reference markers mounted on the first and second sides of the towing vehicle.

5. A method as claimed in claim 3 which includes focusing light from a tail light onto the marker.

6. A method as defined in claim 5, including drilling a hole through at least one rear tail light of the towing vehicle and inserting an optic fibre into the hole, the optic fibre being aligned with one of the markers so that light from the tail light is focused upon the marker to make it visible for night driving.

7. A method as defined in claim 5 wherein the marker is a rod and the end of the rod that is removed from the towed vehicle is enlarged.

8. An apparatus for affixing to a towed vehicle and a towing vehicle under dynamic transport conditions and for monitoring the relative position of the towed vehicle when in forward motion when coupled by a hitch to the towing vehicle when in forward motion comprising:
   (a) a pair of rear view mirrors mounted respectively on a first and a second opposite side of the towing vehicle;
   (b) a first marker member mounted on a first side of the towed vehicle rearward of the hitch so that it is visible in the rear view mirror on the first side of the towing vehicle when viewed by a driver of the towing vehicle;
   (c) a first reference member which is mounted forward of the hitch on the first side of the towing vehicle between the mirror and the first marker member on the first side and in a position which aligns linearly with the first marker member and the rear view mirror;
   (d) a second marker member mounted on a second opposite side of the towed vehicle rearward of the hitch so that it is visible in the rear view mirror on the second opposite side of the towing vehicle when viewed by the driver of the towing vehicle; and
   (e) a second reference member which is mounted forward of the hitch on the second opposite side of the towing vehicle between the mirror and the second marker member on the second side and in a position which aligns linearly with the second marker member and the second rear view mirror, said first and second marker members and said first and second reference members remaining mounted on the towing vehicle and the towed vehicle and in sum, a constant distance from each other, while the towing vehicle coupled to the towed vehicle are under dynamic transport conditions.

9. An apparatus as claimed in claim 8 wherein the marker comprises a rod which is pivotally mounted at one end to the towed vehicle.

10. An apparatus as claimed in claim 9 wherein the rod has a spring attached to the rod at the pivoting end of the rod, and is enlarged at the end opposite the spring.

11. An apparatus as claimed in claim 10 wherein the enlarged end is constructed of a durable material which is coated with a fluorescent material to make it readily visible to the eye.

12. An apparatus as claimed in claim 10 wherein the enlarged end is constructed of a durable material which is coated with a reflective material to make it readily visible to the eye.

13. An apparatus as claimed in claim 8 wherein the marker is constructed so that it is removable and can be extended or reduced in length.

14. An apparatus as claimed in claim 10 wherein the enlarged end of the marker is cylindrical.

15. A method of monitoring the relative alignment position of at least two forwardly moving towed vehicles coupled by first and second hitches in tandem to a forwardly moving towing vehicle equipped with a pair of side mounted rear view mirrors on respective first and second opposite sides of the forwardly moving towing vehicle which comprises:
   (a) affixing a first trailer marker to a first side of the first towed vehicle, rearward of the first hitch, the first trailer marker being visible to a towing vehicle operator in the side rear view mirror on the first side of the towing vehicle;
   (b) affixing a second trailer marker to a first side of the second towed vehicle, rearward of the second hitch, the second trailer marker being visible to the towing vehicle operator in the side rear view mirror on the first side of the towing vehicle;
   (c) affixing a first reference marker to a first side of the towing vehicle, forward of the first hitch and between the rear view mirror on the first side and the first trailer marker in a position that the first reference marker intersects the line of sight between the first trailer marker, the second trailer marker and the rear view mirror;
   (d) affixing a third trailer marker to a second opposite side of the first towed vehicle, rearward of the first hitch, the third trailer marker being visible to the towing vehicle operator in the side rear view mirror on the second side of the towing vehicle;
   (e) affixing a fourth trailer marker to a second opposite side of the second towed vehicle, rearward of the second hitch, the fourth trailer marker being visible to the towing vehicle operator in the side rear view mirror on the second opposite side of the towing vehicle; and
   (f) affixing a second reference marker to a second opposite side of the towing vehicle forward of the first hitch and between the rear view mirror on the second side and the third trailer marker in a position that the second reference marker intersects the lien of sight between the third trailer marker, the fourth trailer marker and the rear view mirror, the first, second, third and fourth trailer markers and the first and second reference markers being maintained in place while the towing vehicle and the towed vehicle are under transport conditions, and any vertical displacement of alignment between the towed vehicle and the towing vehicle being indicated by the first, second, third or fourth trailer markers or the first or second reference markers breaking vertically from the first or second lines of sight.

* * * * *